United States Patent
Ju et al.

(10) Patent No.: US 11,449,899 B2
(45) Date of Patent: Sep. 20, 2022

(54) SYSTEMS AND METHODS FOR PROMOTING GROUPS

(71) Applicant: META PLATFORMS, INC., Menlo Park, CA (US)

(72) Inventors: Li Ju, Issaquah, WA (US); Zhen Li, Cupertino, CA (US); Alkarim Nasser, San Francisco, CA (US); Yuan Liang, Fremont, CA (US); Ritika Prasad, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 405 days.

(21) Appl. No.: 15/797,981

(22) Filed: Oct. 30, 2017

(65) Prior Publication Data

US 2019/0130452 A1 May 2, 2019

(51) Int. Cl.
*G06Q 30/00* (2012.01)
*G06Q 30/02* (2012.01)
*G06Q 50/00* (2012.01)
*G06N 20/00* (2019.01)

(52) U.S. Cl.
CPC ......... *G06Q 30/0269* (2013.01); *G06N 20/00* (2019.01); *G06Q 30/0277* (2013.01); *G06Q 50/01* (2013.01)

(58) Field of Classification Search
CPC ........... G06Q 30/00–30/0284; G06Q 30/0269; G06Q 30/0277; G06Q 50/01; G06N 20/00; G06N 5/022

USPC .............................................. 705/14.1–14.73
See application file for complete search history.

(56) References Cited

U.S. PATENT DOCUMENTS

| | | | | |
|---|---|---|---|---|
| 8,583,684 B1* | 11/2013 | Kirmse | ................... | G06F 16/29 707/770 |
| 2005/0159996 A1* | 7/2005 | Lazarus | ............. | G06Q 30/0207 705/7.31 |
| 2011/0236870 A1* | 9/2011 | Chinosornvatana | ..... | G09B 7/08 434/322 |
| 2011/0288939 A1* | 11/2011 | Elvekrog | ........... | G06Q 30/0251 705/14.67 |
| 2014/0012659 A1* | 1/2014 | Yan | ..................... | G06Q 30/0241 705/14.42 |
| 2014/0108153 A1* | 4/2014 | Matus | ................ | G06Q 30/0269 705/14.66 |
| 2015/0317564 A1* | 11/2015 | Chen | ........................ | G06N 5/02 706/46 |

OTHER PUBLICATIONS

Ryan Stewart, "How [and Why] to Build a Booming Facebook Group", Dec. 29, 2015, https://moz.com/blog/how-to-build-a-facebook-group, pp. 1-56 (Year: 2015).*

(Continued)

*Primary Examiner* — John Van Bramer
(74) *Attorney, Agent, or Firm* — Sheppard Mullin Richter & Hampton LLP

(57) ABSTRACT

Systems, methods, and non-transitory computer readable media configured to receive an initial targeting for an advertisement. The advertisement can promote a group of a social networking system. A refined targeting for the advertisement can be generated. The advertisement based on the refined targeting can be delivered.

20 Claims, 7 Drawing Sheets

(56) References Cited

OTHER PUBLICATIONS

Langley and Carbonell, "Approaches to Machine Learning", Feb. 16, 1984, Journal of the American Society for Information Science, pp. 1-28 (Year: 1984).*

Pramanik et al., "Can i foresee the success of my meetup group?", 2016, IEEE/ACM International Conference on Advances in Social Networks Analysis and Mining (ASONAM 2016) pp. 366-373 (Year: 2016).*

* cited by examiner

SYSTEMS AND METHODS FOR PROMOTING GROUPS

FIELD OF THE INVENTION

The present technology relates to the field of computerized social networking systems. More particularly, the present technology relates to techniques for promoting groups within computerized social networking systems.

BACKGROUND

Users often utilize computing devices for a wide variety of purposes. For example, users of a social networking system can use their computing devices to interact with one another, access content, share content, and create content. To facilitate interactions on a social networking system, users can create and join groups. A group can be focused on a particular topic. A user can make posts, comments, or replies to the group. The posts, comments, and replies can relate to the topic of the group. A group can be associated with a dedicated location on a social networking system. The group, or its dedicated location, can have one or more administrators that manage the presence and interactions of the group on the social networking system.

SUMMARY

Various embodiments of the present disclosure can include systems, methods, and non-transitory computer readable media configured to receive an initial targeting for an advertisement. The advertisement can promote a group of a social networking system. A refined targeting for the advertisement can be generated. The advertisement based on the refined targeting can be delivered.

In an embodiment, for each of one or more users of the social networking system, a rank for the advertisement with respect to the user can be generated. The advertisement can be placed in a news feed of the user based on the rank.

In an embodiment, feature data for the user of the social networking system can be provided to a machine learning model. Feature data for the group of the social networking system can also be provided to the machine learning model. A prediction of a likelihood of the user satisfying an interaction event with respect to the group can be received from the machine learning model.

In an embodiment, the feature data for the user can comprise one or more of social network data for the user, an indication of a willingness of the user to join groups, an indication of kinds of groups the user joins, or an indication of kinds of pages the user follows. Also, the feature data for the group can comprise one or more of a name of the group, a cover photo of the group, a description of the group, one or more tags of the group, one or more locations associated with the group, one or more topics discussed in the group, or feature data of users who have joined the group.

In an embodiment, generating the refined targeting can comprise changing the initial targeting for the advertisement to include some or all of a targeting which is characteristic of a reference set of users of the social networking system.

In an embodiment, for each user of one or more users of the reference set of users, feature data of the user can be provided to a machine learning model. One or more clusters can be received from the machine learning model. Each cluster can include users with similar feature data. One or more of the clusters can be selected. Demographics and interests of the selected one or more clusters can be employed as the targeting which is characteristic of the reference set of users.

In an embodiment, the reference set of users can comprise existing users of the group promoted by the advertisement, users of a group other than the group promoted by the advertisement, or individually-selected users of the social networking system.

In an embodiment, an initial budget for the advertisement can be received. A refined budget for the advertisement can be generated. The delivery of the advertisement can be further based on the refined budget.

In an embodiment, feature data for the advertisement can be provided to a machine learning model. A predicted budget for the advertisement can be received from the machine learning model. The initial budget can be changed to be the predicted budget.

In an embodiment, the feature data for the advertisement can comprise one or more of a size of the group or a growth rate of the group.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
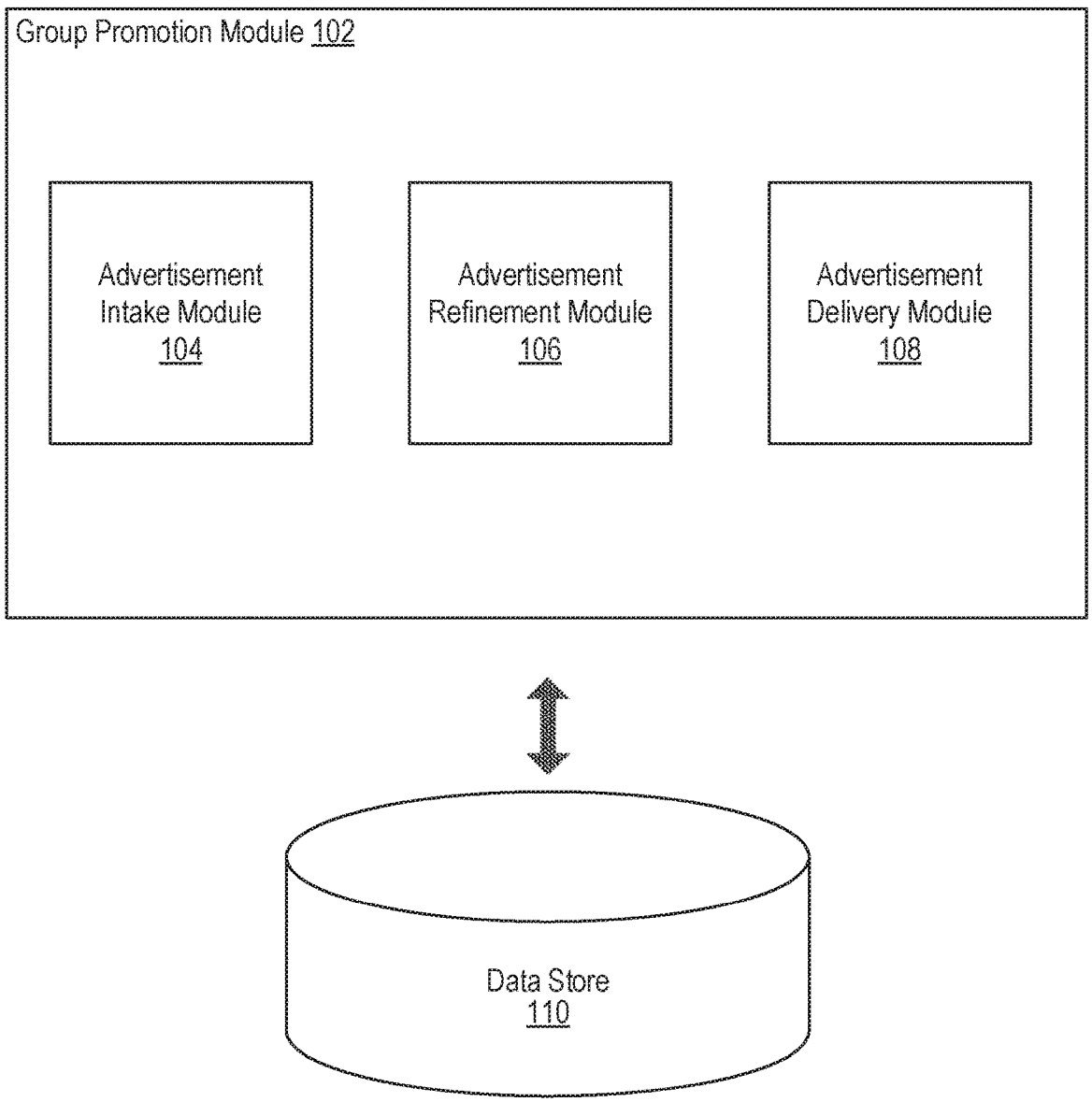
FIG. 1 illustrates an example system including an example group promotion module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Promoting Groups

Users often utilize computing devices for a wide variety of purposes. For example, users of a social networking system can use their computing devices to interact with one another, access content, share content, and create content. To facilitate interactions on a social networking system, users can create and join groups. A group can be focused on a particular topic. A user can make posts, comments, or replies to the group. The posts, comments, and replies can relate to the topic of the group. A group can be associated with a dedicated location on a social networking system. The group, or its dedicated location, can have one or more administrators that manage the presence and interactions of the group on the social networking system.

An administrator of a group can desire to make other users of the social networking system aware of the group. However, according to conventional approaches, the administrator can have limited options for doing so. As one example, the administrator can have a profile and can add to the profile a post which references the group. However, the users who view the post can be limited to users who choose to view the profile of the administrator. As another example, the administrator can use the social networking system to send messages which reference the group to other users of the social networking system. However, the administrator can be limited to sending messages to users of the social networking system who are already known to the administrator.

According to conventional approaches, a social networking system in some instances may allow an advertisement to be used for promotional purposes. However, a conventional social networking system does not typically allow an administrator of a group of the social networking system to use an advertisement to promote the group. Moreover, even if an administrator of a group could use an advertisement to promote a group, the administrator might experience difficultly in doing so. For example, the administrator might experience difficulty in choosing an appropriate budget for the advertisement and an appropriate targeting for the advertisement. Further still, even if an administrator of a group could use an advertisement to promote a group, the advertisement might not be delivered to users targeted by the advertisement in an effective way. As such, a user targeted by an advertisement for a group might be presented with the advertisement in a manner which did not consider, for instance, how likely the user was to join or otherwise interact with the group. Accordingly, the targeted user might suffer a diminished user experience within the social networking system.

Due to these or other concerns, conventional approaches can be disadvantageous or problematic. Therefore, an improved approach can be beneficial for addressing or alleviating various drawbacks associated with conventional approaches. Based on computer technology, the disclosed technology can promote groups of a communication platform, such as a social networking system, in an effective manner. In some embodiments, information regarding an advertisement can be provided to the social networking system. The advertisement can promote a group of the social networking system. The information regarding the advertisement can include an initial targeting for the advertisement and an initial budget for the advertisement. The information can be provided by an administrator of the group. The social networking system can suggest changes to the initial targeting. The social networking system can also suggest a changed budget. The administrator of the group can accept some, all, or none of the changes. Where the administrator accepts some or all of the changes, the social networking system can implement the accepted changes. This can result in a refined targeting and a refined budget for the advertisement.

The social networking system can compare the refined targeting with social network data of users of the social networking system. This can result in a determination of users of the social networking system who match the refined targeting. The social networking system can also formulate, with respect to each of the users who match the refined targeting, a rank for the advertisement. The social networking system can place the advertisement in the news feeds of the users who match the refined targeting. For a user who matches the refined targeting, the advertisement can be displayed in a news feed of the user at a position which reflects the rank formulated with respect to the user. Where the rank formulated with respect to a user who matches the refined targeting falls beneath a threshold, the social networking system does not place the advertisement in the news feed of that user. A fee can be charged in order to place an advertisement in the news feed of a user. Prior to placing the advertisement in the news feed of a user who matches the refined targeting, the social networking system can ascertain whether the refined budget contains sufficient funds to pay the fee. More details regarding the discussed technology are provided herein.

FIG. 1 illustrates an example system 100 including an example group promotion module 102, according to an embodiment of the present disclosure. The group promotion module 102 can promote groups on a social networking system through advertisements. An advertisement can be placed in news feeds of users of the social networking system. The existence of the advertisement in the news feeds of the users can make the users aware of the group. A user of the social networking system who receives the advertisement can select the advertisement. The social networking system can respond to the selection by presenting to the user a dedicated location on the social networking system that is associated with the group. The user can subsequently join the group through interaction with the dedicated location. As shown in the example of FIG. 1, the group promotion module 102 can include an advertisement intake module 104, an advertisement refinement module 106, and an advertisement delivery module 108. In some instances, the example system 100 can include at least one data store 110. The components (e.g., modules, elements, etc.) shown in this figure and all figures herein are exemplary only, and other implementations can include additional, fewer, integrated, or different components. Some components may not be shown so as not to obscure relevant details. In some embodiments, the group promotion module 102 can be implemented in a system, such as a social networking system. While the disclosed technology may be described herein in connection with a social networking system for illustrative purposes, the disclosed technology can be implemented in any other type of system or environment.

In some embodiments, the group promotion module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the group promotion module 102 can be implemented, in part or in whole, as software running on one or more computing devices or systems. For example, the group promotion module 102 or at least a portion thereof can be implemented using one or more computing devices or systems that include one or more servers, such as network servers or cloud servers. In another example, the group promotion module 102 or at least a portion thereof can be implemented as or within an application (e.g., app), a program, an applet, or an operating system, etc., running on a user computing device or a client computing system, such as a user device 610 of FIG. 6. In some instances, the group promotion module 102 can, in part or in whole, be implemented within or configured to operate in conjunction with a system (or service), such as a social networking system 630 of FIG. 6. It should be understood that there can be many variations or other possibilities.

The group promotion module 102 can be configured to communicate and/or operate with the at least one data store 110, as shown in the example system 100. The at least one data store 110 can be configured to store and maintain various types of data. For example, the data store 110 can store information used or generated by the group promotion module 102. The information used or generated by the group promotion module 102 can include, for example, descriptive text for advertisements, targeting for advertisements, budgets for advertisements, data regarding reference sets of users, and training data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

The advertisement intake module 104 can receive information regarding an advertisement relating to a group. The information regarding the advertisement can be provided by an administrator of the group. The information regarding the advertisement as well as other information or selections provided by an administrator can be provided by the administrator via an input applied to a user interface of a user computing device associated with the administrator. The information regarding the advertisement can include descriptive text. The descriptive text can be visible in the news feed of a user who receives the advertisement. The descriptive text can describe or characterize the group, as well as encourage users of the social networking system to join or otherwise interact with the group.

The information regarding the advertisement can include an initial targeting for the advertisement. The initial targeting for the advertisement can be specified in terms of, for example, demographics and interests of the users. As examples, the demographics of the users can relate to geographic locations, ages, languages, genders, etc. As examples, the interests of the users can relate to "sports," "fitness," "fashion," "film," etc. Many variations are possible.

The information regarding the advertisement can include an initial budget for the advertisement. The initial budget for the advertisement can be an amount of money which is available for delivering the advertisement to users of the social networking system. As examples, the amount of money can be indicated in terms of US dollars, Canadian dollars, Mexican pesos, UK Pounds, European euros, South Korean won, Chinese yuan, or Japanese yen.

The advertisement refinement module 106 can suggest and implement changes to the information regarding an advertisement provided to the advertisement intake module 104. For example, the advertisement refinement module 106 can be used to generate a refined targeting for the advertisement and a refined budget for the advertisement. Additional details regarding the advertisement refinement module 106 are provided below with reference to FIG. 2.

The advertisement delivery module 108 can determine a user to match a targeting of an advertisement. The targeting can be a refined targeting where one or more targeting changes suggested by the advertisement refinement module 106 are accepted by an administrator. The targeting can be an initial targeting where the targeting changes suggested by the advertisement refinement module 106 are not accepted by the administrator. The advertisement delivery module 108 can also rank the advertisement with respect to the user, and place the advertisement in a news feed of the user based on the ranking. Additional details regarding the advertisement delivery module 108 are provided below with reference to FIG. 3.

Figure 2:
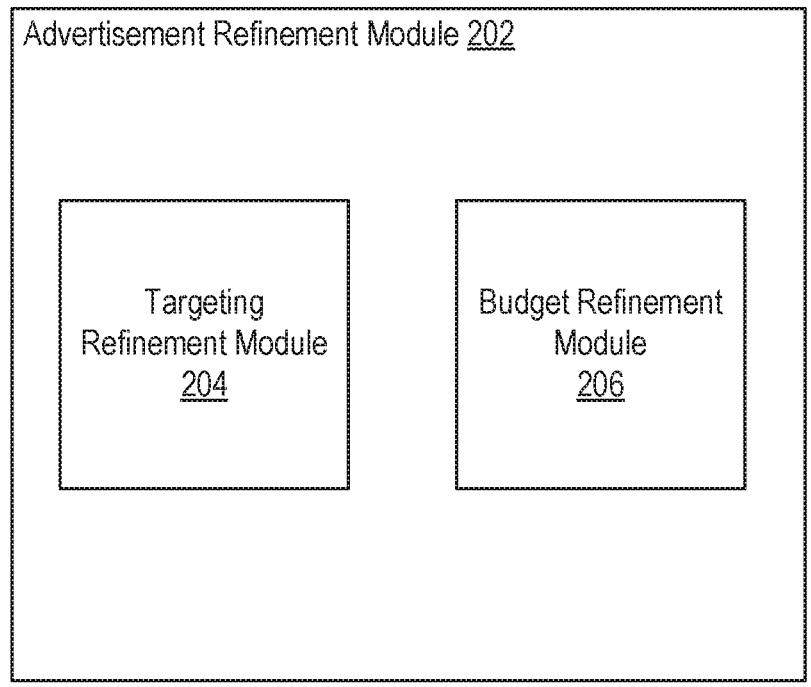
FIG. 2 illustrates an example of an advertisement refinement module, according to an embodiment of the present disclosure.

FIG. 2 illustrates an example advertisement refinement module 202, according to an embodiment of the present disclosure. In some embodiments, the advertisement refinement module 106 of FIG. 1 can be implemented as the example advertisement refinement module 202. As shown in FIG. 2, the advertisement refinement module 202 can include a targeting refinement module 204 and a budget refinement module 206.

The targeting refinement module 204 can aid an administrator of a group being promoted by an advertisement in having the advertisement target users that are similar to a reference set of users. In particular, the targeting refinement module 204 can provide as a suggested targeting for the advertisement a targeting which is characteristic of the reference set of users.

The targeting refinement module 204 can first provide the administrator with various alternatives for the reference set of users. The administrator can select from the various alternatives a desired reference set of users. The selection can be performed via a user computing device.

As one example, the alternatives for the reference set of users can include a reference set of users made up of existing users of the group which is promoted by the advertisement. As another example, the alternatives for the reference set of users can include a reference set of users made up of users of a group other than the group which is promoted by the advertisement. The administrator can specify the other group. As a further example, the alternatives for the reference set of users can include a reference set of users made up of users of the social networking system that are individually selected by the administrator. In one implementation, the administrator can individually select the users by uploading a list of users to the social networking system.

In some embodiments, the targeting refinement module 204 can use a machine learning model to determine a targeting which is characteristic of the selected alternative for the reference set of users. As one illustration, the machine learning model can apply a generally known approach for clustering. For each user of the selected alternative for the reference set of users, the targeting refinement module 204 can provide feature data of the user as input to the machine learning model. As an example, the feature data can be demographic information and interests relating to the user. The machine learning model can subsequently cluster the users of the selected alternative for the reference set of users based on the feature data. As a result, users with similar feature data can be assigned to a given cluster. The targeting refinement module 204 can then select one or more of the clusters. For instance, the targeting refinement module 204 can select one or more of clusters that satisfy a threshold size value. Subsequently, the targeting refinement module 204 can use demographics and interests associated with the selected one or more clusters as the targeting which is characteristic of the selected alternative for the reference set of users. As one illustration, the targeting refinement module 204 can select the largest of the clusters. The demographics and interests associated with the selected cluster can be considered characteristic of the reference set of users by virtue of reflecting the largest grouping of users with similar feature data. Many variations are possible. One or more machine learning models discussed in connection with the group promotion module 102 and its components can be implemented separately or in combination, for example, as a single machine learning model, as multiple machine learning models, as one or more staged machine learning models, as one or more combined machine learning models, etc.

The targeting refinement module 204 can then provide as a suggested targeting for the advertisement the targeting which is characteristic of the selected alternative for the reference set of users. The targeting refinement module 204 can receive from the administrator an indication of which portions, if any, of the suggested targeting the administrator desires to accept. Where the administrator accepts some or all of the suggested targeting, the targeting refinement module 204 can change an initial targeting for the advertisement to reflect those portions of the suggested targeting that were accepted by the administrator. This can yield a refined targeting. The refined targeting can subsequently be used as the targeting for the advertisement. Where none of the suggested targeting is accepted, the initial targeting can be used as the targeting for the advertisement. The suggested targeting as well as other information to be presented to an administrator can be presented through a user interface of a user computing device associated with the administrator.

The budget refinement module 206 can refine an initial budget for an advertisement for a group. The budget refinement module 206 can use a machine learning model which predicts a budget for an advertisement. In some embodiments, the machine learning model can apply a generally known approach for regression. The budget refinement module 206 can train the machine learning model based on training data. The training data can correspond to previous advertisements for groups within the social networking system. An instance of training data can include, as training data input, feature data for an advertisement for a group. The feature data can include, for example, a size of the group and a growth rate of the group. The instance of training data can include, as training data output, a budget for the advertisement.

In some embodiments, the training data can correspond to advertisements which have achieved a threshold for effectiveness. For example, the threshold for effectiveness can be placement in the news feeds of at least a threshold percentage of existing group members. For instance, the training data can correspond to advertisements which promoted groups which had existing members. For a given one of these advertisements, the quantity of users who received the advertisement can be equal to at least a threshold percentage of the quantity of existing group members. As an illustration, suppose a threshold percentage of 50% of existing group members. An advertisement for a group which had ten existing members and which was placed in the news feeds of six users might be included in the training data. On the other hand, an advertisement for a group which had one million existing members and which was placed in the news feeds of six users might not be included in the training data.

Once the machine learning model has been trained, the budget refinement module 206 can use the machine learning model to formulate a suggested budget for an advertisement for a group. The budget refinement module 206 can provide feature data for the advertisement as input to the machine learning model. The feature data can include a size of the group and a growth rate of the group. The budget refinement module 206 can receive from the machine learning model an output that is a predicted budget for the advertisement. The budget refinement module 206 can use the predicted budget for the advertisement as the suggested budget for the advertisement.

Subsequently, the budget refinement module 206 can present the suggested budget to the administrator. The budget refinement module 206 can receive from the administrator an indication of whether or not the administrator desires to accept the suggested budget. Where the suggested budget is accepted, the budget refinement module 206 can replace the initial budget for the advertisement with the suggested budget. This can yield a refined budget. The refined budget can subsequently be used as the budget for the advertisement. Where the suggested budget is not accepted, the initial budget can be used as the budget for the advertisement.

Figure 3:
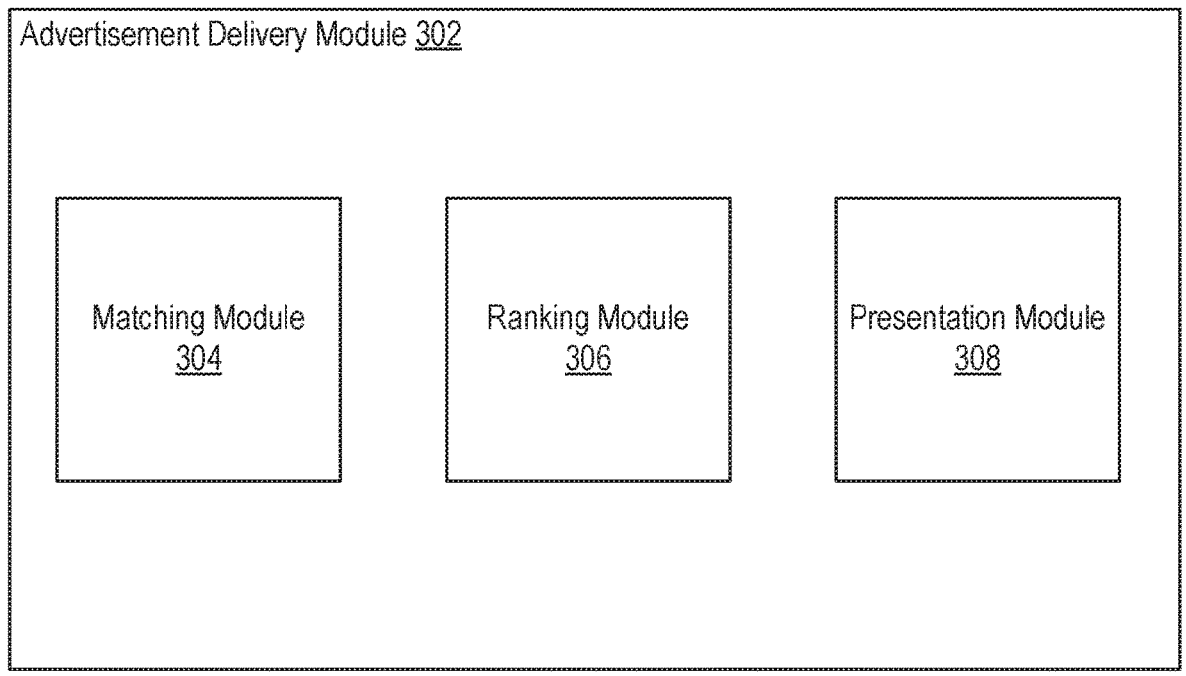
FIG. 3 illustrates an example of an advertisement delivery module, according to an embodiment of the present disclosure.

FIG. 3 illustrates an example advertisement delivery module 302, according to an embodiment of the present disclosure. In some embodiments, the advertisement delivery module 108 of FIG. 1 can be implemented as the example advertisement delivery module 302. As shown in FIG. 3, the advertisement delivery module 302 can include a matching module 304, a ranking module 306, and a presentation module 308.

The matching module 304 can identify users of a social networking system who match a targeting for an advertisement. The users of the social networking system who match the targeting can be users who have social network data which matches the targeting for the advertisement. For each user of the social networking system, the matching module 304 can compare the social network data for the user to the targeting for the advertisement. The targeting can be a refined targeting where one or more targeting changes suggested by the advertisement refinement module 106 are accepted. The targeting can be an initial targeting where the targeting changes suggested by the advertisement refinement module 106 are not accepted. Where the social network data for the user matches (or is similar within a threshold value of difference to) the targeting for the advertisement, the matching module 304 can denote the user as matching the targeting for the advertisement.

The ranking module 306 can formulate a rank for an advertisement with respect to a user of a social networking system. The user can be a user who has been denoted by the matching module 304 as matching a targeting for the advertisement.

The ranking module 306 can use a machine learning model which predicts a likelihood of a user of the social networking system satisfying an interaction event with respect to a group. As one example, the interaction event can be the user joining the group. As another example, the interaction event can be the user creating or reading posts or comments of the group for at least a threshold amount of time. As one illustration, the threshold amount of time can be a selected number of minutes per week.

The ranking module 306 can train the machine learning model based on training data. An instance of training data can include, as training data input, feature data for a user and feature data for a group, as discussed in more detail below.

The instance of training data can include, as training data output, an indication of whether or not the user satisfied the interaction event with respect to the group. As an example, the ranking module 306 can provide a 1 to the machine learning model where the user has satisfied the interaction event, and provide a 0 to the machine learning model where the user has not satisfied the interaction event.

As discussed, the ranking module 306 can use feature data for a user in training the machine learning model and, as discussed below, in using the machine learning model to generate a rank. The feature data for the user can include social network data for the user, an indication of a willingness of the user to join groups, an indication of the kinds of groups the user joins, and an indication of the kinds of pages the user follows. The social network data for the user can include demographic information and interest information relating to the user. The willingness of the user to join groups can be expressed as, for example, a quantity of group join requests sent by the user within a selected period of time. For instance, the selected period of time can be a preceding month. The kinds of groups the user joins can be expressed as, for example, names of the groups, cover photos of the groups, descriptions of the groups, tags of the groups, locations associated with the groups, topics discussed in the groups, and feature data of users who have already joined the groups. The kinds of pages the user follows can be expressed as, for example, names of the pages, profile pictures of the pages, cover photos of the pages, descriptions of the pages, tags of the pages, locations associated with the pages, and feature data of other users who follow the pages.

In some embodiments, the feature data for the user can include other types of information. For example, the feature data for the user can include an indication of the kinds of events for which the user accepts invitations. The kinds of events for which the user accepts invitations can be expressed as, for example, names of the events, event photos of the events, descriptions of the events, locations associated with the events, time ranges associated with the events, and feature data of users who have accepted invitations to the events. As another example, the feature data for the user can include feature data regarding other users who are friends of the user within the social networking system. As yet another example, the feature data for the user can include feature data regarding other users who are friends of those friends within the social networking system.

As discussed, the ranking module 306 can use feature data for a group in training the machine learning model and, as discussed below, in using the machine learning model to generate a rank. The feature data for the group can include, for example, a name of the group, a cover photo of the group, a description of the group, tags of the group, locations associated with the group, topics discussed in the group, and feature data of users who have already joined the group.

Once the machine learning model has been trained, the ranking module 306 can use the machine learning model to generate a rank. The ranking module 306 can provide, as input to the machine learning model, feature data for a user who has been denoted by the matching module 304. The ranking module 306 can also provide, as input to the machine learning model, feature data for the group which corresponds to the advertisement being ranked. The ranking module 306 can receive from the machine learning model an output that is a prediction of a likelihood of the user satisfying a selected interaction event with respect to the group. The ranking module 306 can use the likelihood as the rank. As an example, the likelihood can be a value v falling within the range $0 \leq v \leq 1$. There can be many variations or other possibilities.

The presentation module 308 can present an advertisement to a user who matches a targeting for the advertisement. The advertisement can be associated with a rank determined by the ranking module 306. The presentation module 308 can place the advertisement in a news feed of the user. The placement of the advertisement in the news feed can be based on the rank associated with the advertisement. This can cause the advertisement to be displayed, along with other ranked items of the news feed, at a position within the news feed which reflects the rank. The other ranked items of the news feed can include posts, comments, and other advertisements. As an example, items with higher ranks can be displayed higher within the news feed. In some embodiments, where the rank of the advertisement falls beneath a threshold, the presentation module 308 does not place the advertisement in the news feed. There can be many variations or other possibilities.

In some embodiments, the social networking system can charge a fee to place the advertisement in the news feed of the user. In these embodiments, prior to placing the advertisement in the news feed of the user, the presentation module 308 can compare a refined budget or an initial budget for the advertisement with the fee. The budget can be a refined budget where a budget suggested by the advertisement refinement module 106 is accepted. The budget can be an initial budget where the budget suggested by the advertisement refinement module 106 is not accepted.

Where the budget contains sufficient funds to pay the fee, the presentation module 308 can withdraw the fee from the budget and place the advertisement in the news feed of the user. Where the budget does not contain sufficient funds to pay the fee, the presentation module 308 does not place the advertisement in the news feed of the user. In some embodiments, the presentation module 308 can also inform an administrator of the group that the budget does not contain sufficient funds to pay the fee. Many variations are possible.

Figure 4:
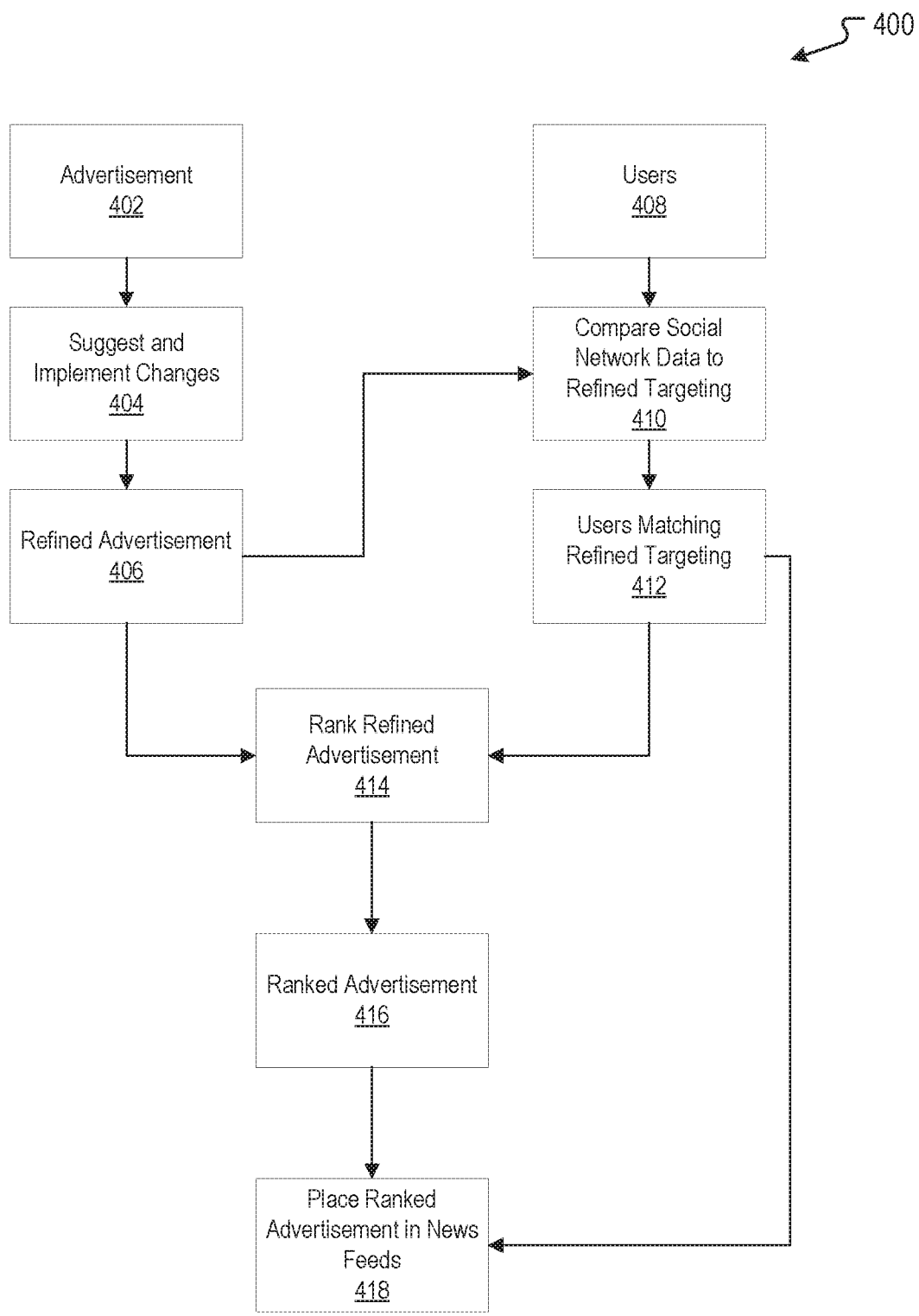
FIG. 4 illustrates an example functional block diagram, according to an embodiment of the present disclosure.

FIG. 4 illustrates an example functional block diagram 400, according to an embodiment of the present disclosure. The example functional block diagram 400 illustrates promotion of groups through advertisements, according to an embodiment of the present disclosure. Information regarding an advertisement 402 can be provided to a social networking system. The advertisement 402 can promote a group associated with a dedicated location on the social networking system. The information regarding the advertisement 402 can include an initial targeting for the advertisement 402 and an initial budget for the advertisement 402. The information regarding the advertisement can be provided to the social networking system by an administrator of the group.

At block 404, the social networking system can suggest one or more changes to the initial targeting. The suggested targeting changes can reflect a targeting which is characteristic of a reference set of users of the social networking system. The reference set of users can be selected by the administrator of the group. The social networking system can use a machine learning model in generating the targeting which is characteristic of the reference set of users, as discussed in more detail above. Also at block 404, the social networking system can suggest a changed budget. The changed budget can reflect a predicted budget for the advertisement. The social networking system can use a further machine learning model in generating the predicted budget, as discussed in more detail above.

The administrator can accept some, all, or none of the suggested targeting changes, and can accept or reject the changed budget. In the example of FIG. 4, the administrator accepts the changed budget, and at least some of the changes to the targeting. Further at block 404, the social networking system can implement those changes which have been accepted by the administrator. This can result in a refined advertisement 406 associated with a refined targeting and a refined budget.

At block 410, the social networking system can compare social network data with the refined targeting. The social network data can correspond to users 408 of the social networking system. Where the social network data for a given user of the users 408 matches the refined targeting, the social networking system can denote the user as matching the refined targeting. This can result in users 412 who match the refined targeting.

At block 414, the social networking system can formulate a rank for the refined advertisement 406 with respect to each of the users 412 who match the refined targeting. The social networking system can use an additional machine learning model in generating the ranks. This can result in a ranked advertisement 416 associated with the formulated ranks. Finally, at block 418 the social networking system can place the ranked advertisement 416 in the news feeds of the users 412 who match the refined targeting. A fee can be charged in order to place an advertisement in the news feed of a user. Prior to placing the ranked advertisement 416 in the news feed of a given one of the users 412, the social networking system can ascertain whether the refined budget contains sufficient funds to pay the fee.

The ranked advertisement 416 can be displayed, in the news feed of a given one of the users 412, at a position which reflects the rank formulated with respect to the user. In some embodiments, where the rank formulated with respect to a given one of the users 412 falls beneath a threshold, the social networking system does not place the ranked advertisement 416 in the news feed of that user. While the foregoing has been provided as an illustration, many variations are possible in accordance with the present technology.

Figure 5:
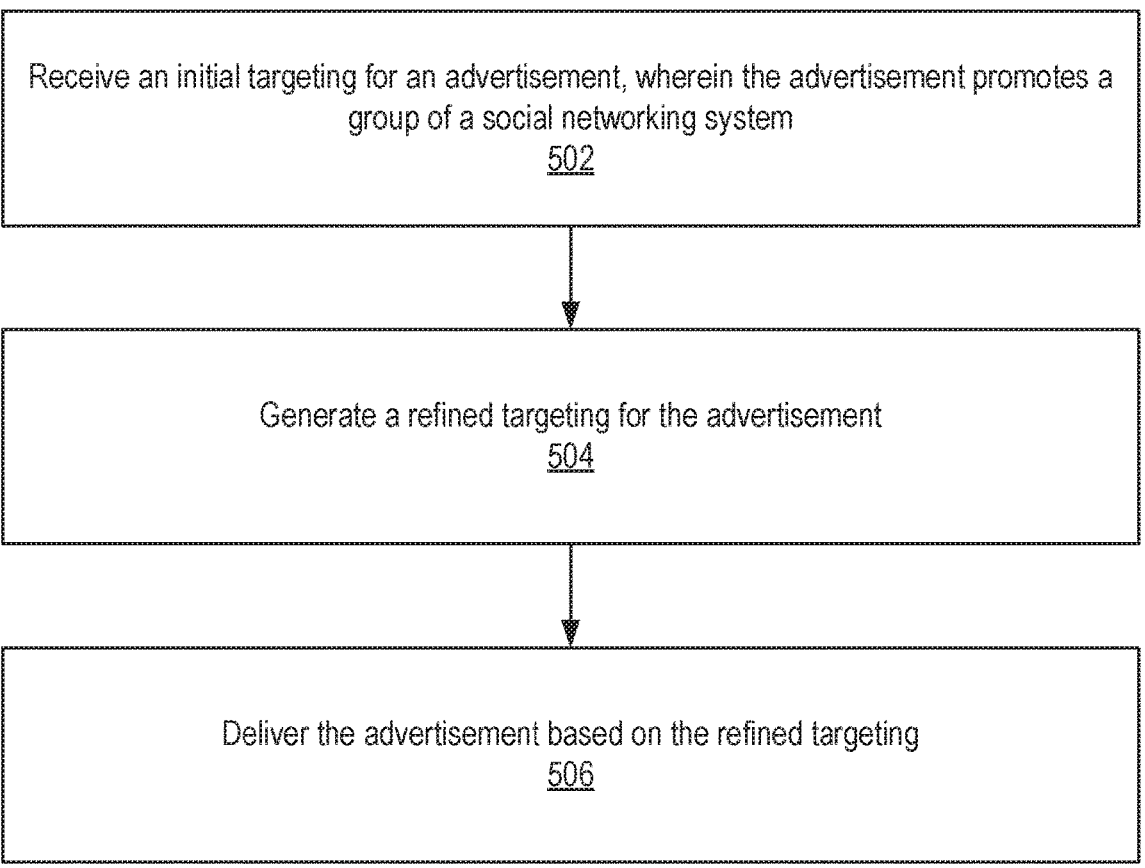
FIG. 5 illustrates an example process, according to an embodiment of the present disclosure.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can receive an initial targeting for an advertisement, wherein the advertisement promotes a group of a social networking system. At block, 504 the process can generate a refined targeting for the advertisement. Then, at block 506, the process can deliver the advertisement based on the refined targeting.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
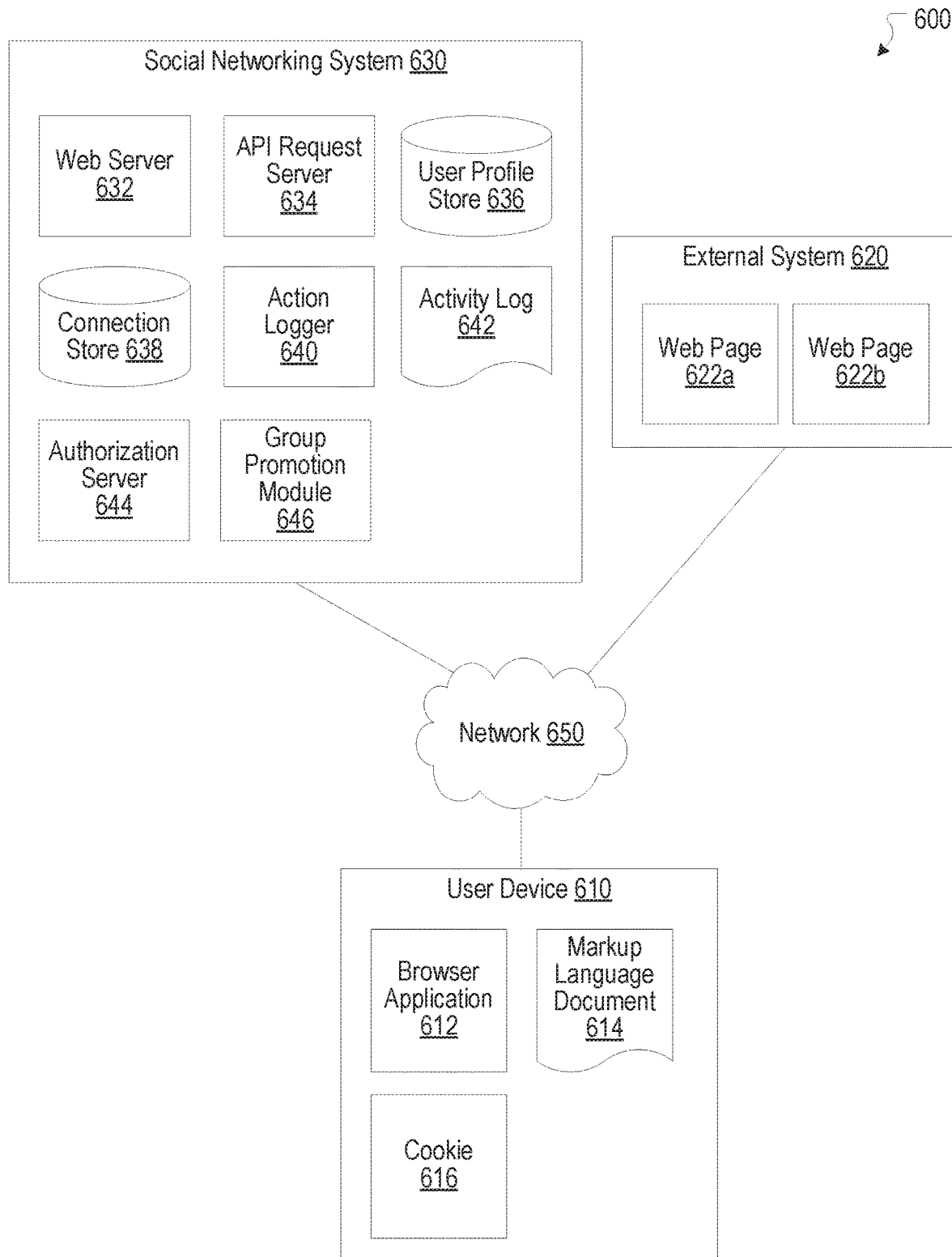
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a group promotion module 646. The group promotion module 646 can, for example, be implemented as the group promotion module 102 of FIG. 1. In some embodiments, some or all of the functionality of the group promotion module 646 (e.g., sub modules of the group promotion module 102) instead can be implemented in the user device 610.

Hardware Implementation

Figure 7:
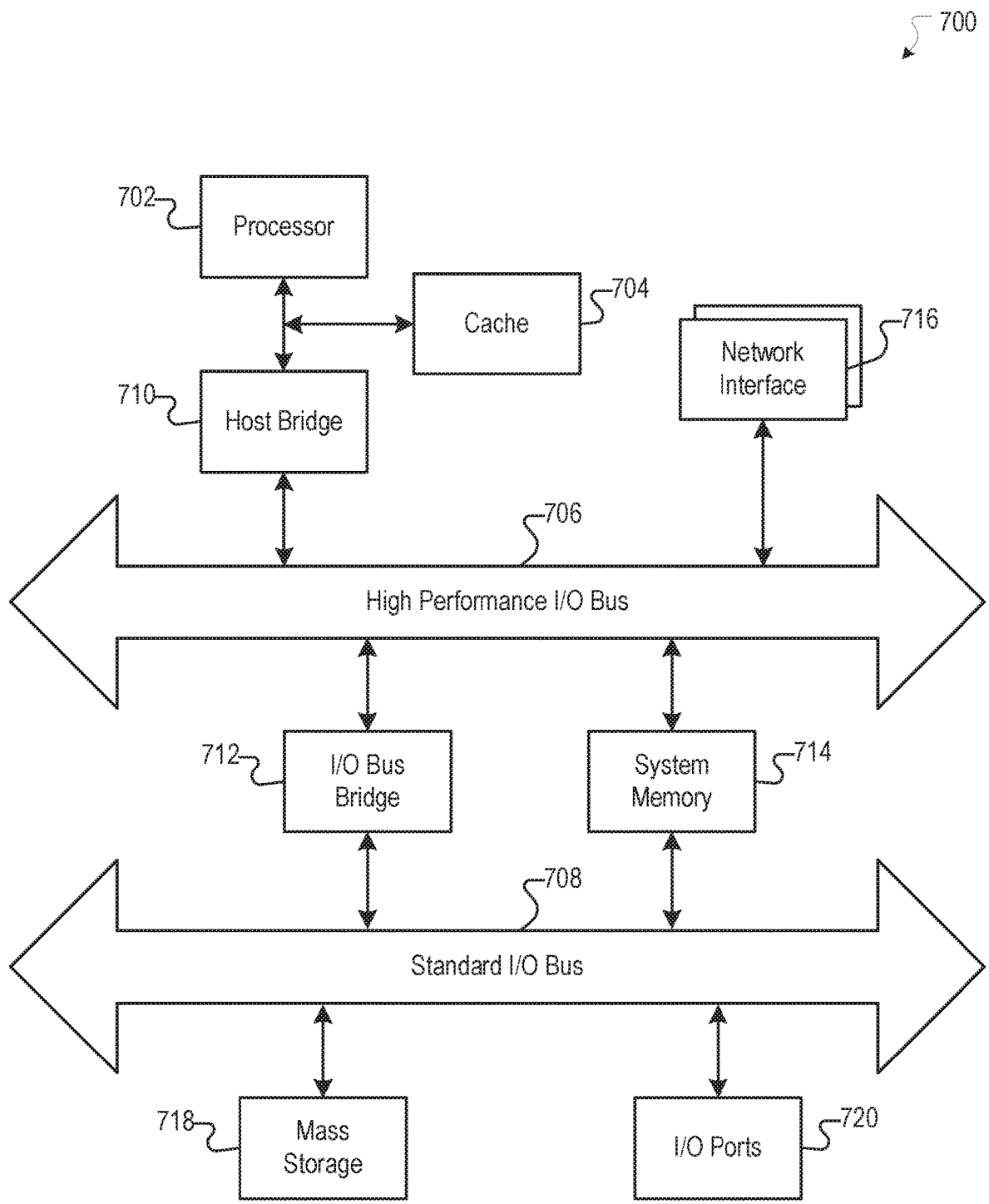
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, an initial targeting for an advertisement based at least in part on a selected set of users, wherein the advertisement promotes a group of a system and includes an interaction event;
   determining, by the computing system, clusters associated with the selected set of users, wherein the clusters are associated with demographics and interests of users of the system and include at least one user of the selected set of users and at least one other user of the system, wherein the clusters are determined based on a machine learning model of the computing system trained based on training data that includes the demographics and the interests of the users of the system;
   generating, by the computing system, one or more suggested targetings based at least in part on a selection of a cluster of the determined clusters that satisfies a threshold size value;
   providing, by the computing system, the one or more suggested targetings;
   receiving, by the computing system, a refined targeting for the advertisement based at least in part on a selection of at least one of the one or more suggested targetings;
   generating, by the computing system, ranks for the interaction event associated with the advertisement with respect to the users of the refined targeting based at least in part on indications of willingness of the users to join groups, wherein the indications of willingness include a quantity of group join requests sent by the users within a selected period of time, wherein the generating comprises:
      providing, by the computing system, to the machine learning model, user feature data, including at least an indication of willingness to join groups, for the users of the refined targeting;
      providing, by the computing system, to the machine learning model, group feature data, including at least one of: a name of the group, a cover photo of the group, a description of the group, tags of the group, locations associated with the group, topics discussed in the group, and feature data of users who have joined the group, for the group of the system;
      receiving, by the computing system, from the machine learning model, a prediction of likelihood of satisfying an interaction event with respect to the group for each user of the users of the refined targeting; and
      ranking, by the computing system, the users of the refined targeting based on the prediction of likelihood of satisfying the interaction event associated with the advertisement for each of the users of the refined targeting; and
   delivering, by the computing system, the advertisement based at least in part on the refined targeting and the ranks for the interaction event associated with the advertisement, wherein the advertisement is delivered to the users of the refined targeting that satisfy a threshold rank.

2. The computer-implemented method of claim 1, wherein the delivering the advertisement comprises:
   placing, by the computing system, the advertisement in news feeds of the users of the refined targeting based at least in part on the ranks for the advertisement with respect to the users.

3. The computer-implemented method of claim 1, wherein the
   interaction event includes at least one of joining the group, creating a post for the group, or creating a comment for the group.

4. The computer-implemented method of claim 1, wherein:
the user feature data includes one or more of social data for the users, indications of kinds of groups the users join, or indications of kinds of pages the users follows; and
the group feature data includes the user feature data of users who have joined the group.

5. The computer-implemented method of claim 1, wherein the generating the refined targeting comprises:
changing, by the computing system, the initial targeting for the advertisement to include some or all of a targeting which is characteristic of a reference set of users of the system.

6. The computer-implemented method of claim 5, further comprising:
providing, by the computing system, to the machine learning model, for each user of one or more users of the reference set of users, user feature data of the user;
receiving, by the computing system, from the machine learning model, the clusters, wherein the clusters include users with similar user feature data;
selecting, by the computing system, one or more of the clusters; and
employing, by the computing system, the demographics and the interests of the selected one or more clusters as the targeting which is characteristic of the reference set of users.

7. The computer-implemented method of claim 5, wherein the reference set of users comprises existing users of the group promoted by the advertisement, users of a group other than the group promoted by the advertisement, or individually-selected users of the system.

8. The computer-implemented method of claim 1, further comprising:
receiving, by the computing system, an initial budget for the advertisement; and
generating, by the computing system, a refined budget for the advertisement,
wherein the delivering of the advertisement is further based at least in part on the refined budget.

9. The computer-implemented method of claim 8, wherein the generating the refined budget comprises:
providing, by the computing system, to a machine learning model, feature data for the advertisement;
receiving, by the computing system, from the machine learning model, a predicted budget for the advertisement; and
changing, by the computing system, the initial budget to be the predicted budget.

10. The computer-implemented method of claim 9, wherein the feature data for the advertisement comprises one or more of a size of the group or a growth rate of the group.

11. A system comprising:
at least one processor; and
a memory storing instructions that, when executed by the at least one processor, cause the system to perform:
receiving an initial targeting for an advertisement based at least in part on a selected set of users, wherein the advertisement promotes a group of the system and includes an interaction event;
determining clusters associated with the selected set of users, wherein the clusters are associated with demographics and interests of users of the system and include at least one user of the selected set of users and at least one other user of the system, wherein the clusters are determined based on a machine learning model of the computing system trained based on training data that includes the demographics and the interests of the users of the system;
generating one or more suggested targetings based at least in part on a selection of a cluster of the determined clusters that satisfies a threshold size value;
providing the one or more suggested targetings;
receiving a refined targeting for the advertisement based at least in part on a selection of at least one of the one or more suggested targetings;
generating ranks for the interaction event associated with the advertisement with respect to the users of the refined targeting based at least in part on indications of willingness of the users to join groups, wherein the indications of willingness include a quantity of group join requests sent by the users within a selected period of time, wherein the generating comprises:
providing, to the machine learning model, user feature data, including at least an indication of willingness to join groups, for the users of the refined targeting;
providing, to the machine learning model, group feature data, including at least one of: a name of the group, a cover photo of the group, a description of the group, tags of the group, locations associated with the group, topics discussed in the group, and feature data of users who have joined the group, for the group of the system; and
receiving, from the machine learning model, a prediction of likelihood of satisfying an interaction event with respect to the group for each user of the users of the refined targeting; and
ranking the users of the refined targeting based on the prediction of likelihood of satisfying the interaction event associated with the advertisement for each of the users of the refined targeting; and
delivering the advertisement based at least in part on the refined targeting and the ranks for the interaction event associated with the advertisement, wherein the advertisement is delivered to the users of the refined targeting that satisfy a threshold rank.

12. The system of claim 11, wherein the delivering the advertisement comprises:
placing the advertisement in news feeds of the users of the refined targeting based at least in part on the ranks for the advertisement with respect to the users.

13. The system of claim 12, wherein the
interaction event includes at least one of joining the group, creating a post for the group, or creating a comment for the group.

14. The system of claim 11, wherein the generating the refined targeting comprises:
changing the initial targeting for the advertisement to include some or all of a targeting which is characteristic of a reference set of users of the system.

15. The system of claim 11, wherein the instructions, when executed by the at least one processor, further cause the system to perform:
receiving an initial budget for the advertisement; and
generating a refined budget for the advertisement, wherein the delivering of the advertisement is further based at least in part on the refined budget.

16. A non-transitory computer-readable storage medium including instructions that, when executed by at least one processor of a computing system, cause the computing system to perform a method comprising:
receiving an initial targeting for an advertisement based at least in part on a selected set of users, wherein the advertisement promotes a group of a system and includes an interaction event;

determining clusters associated with the selected set of users, wherein the clusters are associated with demographics and interests of users of the system and include at least one user of the selected set of users and at least one other user of the system, wherein the clusters are determined based on a machine learning model of the computing system trained based on training data that includes the demographics and the interests of the users of the system;

generating one or more suggested targetings based at least in part on a selection of a cluster of the determined clusters that satisfies a threshold size value;

providing the one or more suggested targetings;

receiving a refined targeting for the advertisement based at least in part on a selection of at least one of the one or more suggested targetings;

generating ranks for the interaction event associated with the advertisement with respect to the users of the refined targeting based at least in part on indications of willingness of the users to join groups, wherein the indications of willingness include a quantity of group join requests sent by the users within a selected period of time, wherein the generating comprises:
  providing, to the machine learning model, user feature data, including at least an indication of willingness to join groups, for the users of the refined targeting;
  providing, to the machine learning model, group feature data, including at least one of: a name of the group, a cover photo of the group, a description of the group, tags of the group, locations associated with the group, topics discussed in the group, and feature data of users who have joined the group, for the group of the system;
  receiving, from the machine learning model, a prediction of likelihood of satisfying an interaction event with respect to the group for each user of the users of the refined targeting; and
  ranking the users of the refined targeting based on the prediction of likelihood of satisfying the interaction event associated with the advertisement for each of the users of the refined targeting; and delivering the advertisement based at least in part on the refined targeting and the ranks for the interaction event associated with the advertisement, wherein the advertisement is delivered to the users of the refined targeting that satisfy a threshold rank.

17. The non-transitory computer-readable storage medium of claim 16, wherein the delivering the advertisement comprises:
  placing the advertisement in news feeds of the users of the refined targeting based at least in part on the ranks for the advertisement with respect to the users.

18. The non-transitory computer-readable storage medium of claim 17, wherein the
  interaction event includes at least one of joining the group, creating a post for the group, or creating a comment for the group.

19. The non-transitory computer-readable storage medium of claim 16, wherein the generating the refined targeting comprises:
  changing the initial targeting for the advertisement to include some or all of a targeting which is characteristic of a reference set of users of the system.

20. The non-transitory computer-readable storage medium of claim 16, wherein the instructions, when executed by the at least one processor of the computing system, further cause the computing system to perform:
  receiving an initial budget for the advertisement; and
  generating a refined budget for the advertisement, wherein the delivering of the advertisement is further based at least in part on the refined budget.

* * * * *